Aug. 25, 1931.  J. B. BASKERVILLE  1,820,770
IMPACT RECORDER
Filed May 7, 1928  2 Sheets-Sheet 1
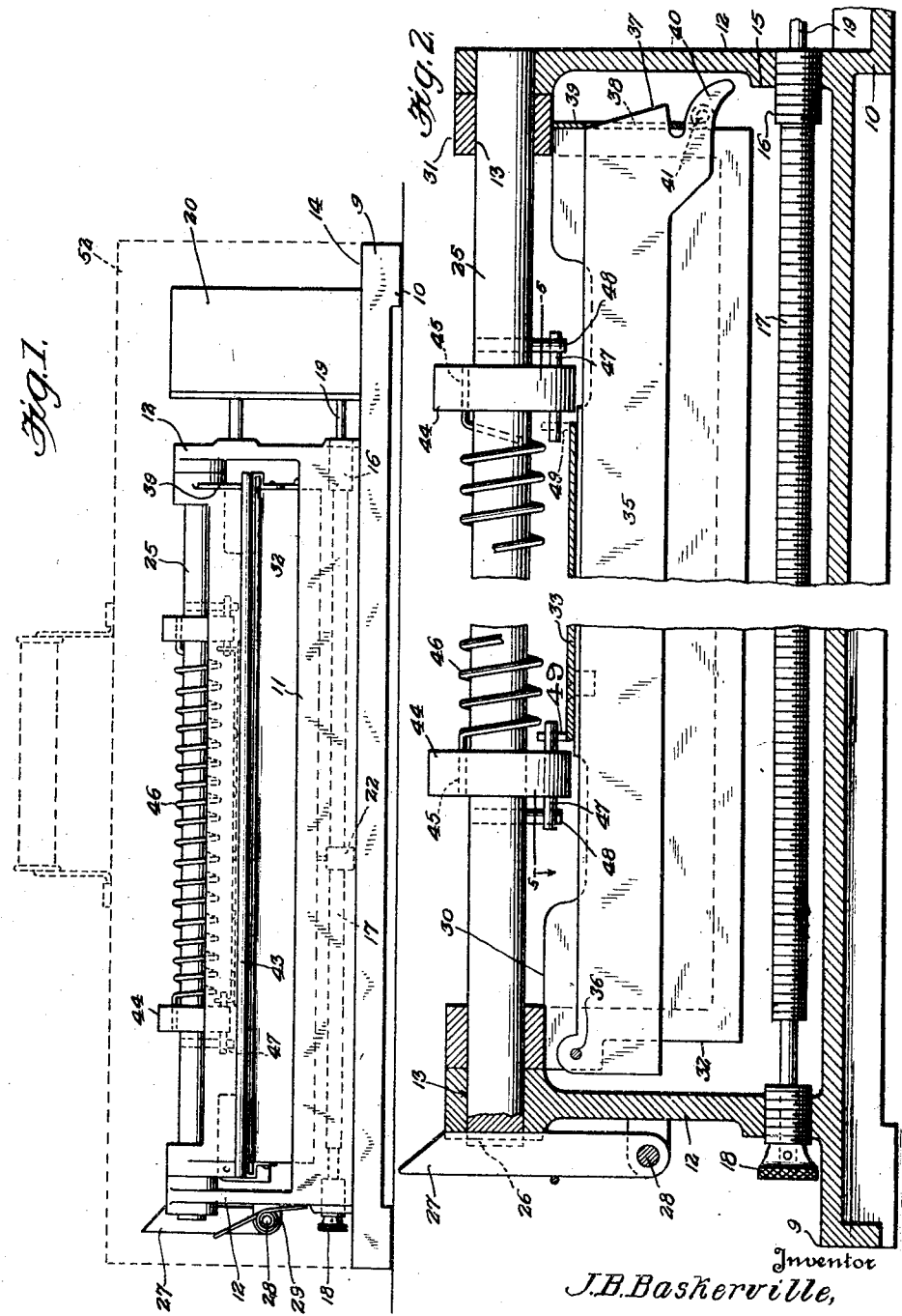
Inventor
J.B.Baskerville,
By Bernard F. Garvey
Attorney Aug. 25, 1931.  J. B. BASKERVILLE  1,820,770
IMPACT RECORDER
Filed May 7, 1928   2 Sheets-Sheet 2
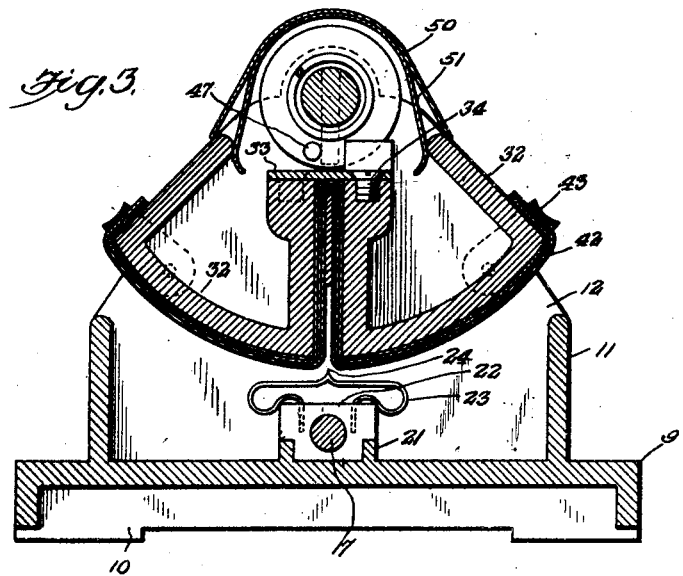
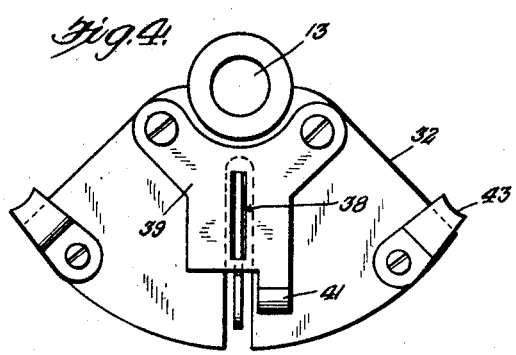
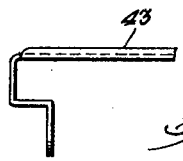
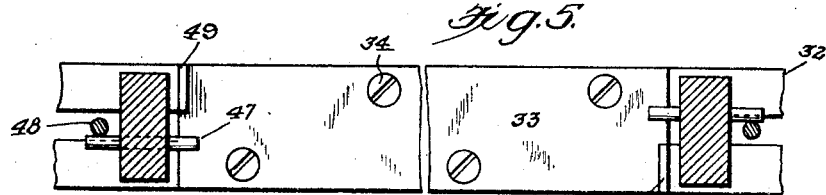
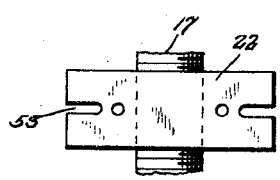
Inventor
J. B. Baskerville,
By Bernard F. Garvey
Attorney Patented Aug. 25, 1931

1,820,770

UNITED STATES PATENT OFFICE

JOHN B. BASKERVILLE, OF ROANOKE, VIRGINIA, ASSIGNOR TO IMPACTOGRAPH CORPORATION, OF ROANOKE, VIRGINIA, A CORPORATION OF VIRGINIA

IMPACT RECORDER

Application filed May 7, 1928. Serial No. 275,931.

The present invention consists of an impact recorder and is designed as an improvement over my issued Patent No. 1,577,160, issued March 16th, 1926.

An object of the invention is to provide a device which is especially adapted for use on railway rolling stock in order to record impacts sustained by the rolling stock, the recordation including the time of occurrence of the impact as well as the intensity thereof.

A further object of the invention is to provide an exceedingly simple and compact recorder of this type which may be superimposed on the car floor, at any desired point, and anchored thereon to translate impacts sustained by the car.

A still further object of the invention is to provide a recorder of this character which embodies a record sheet carrying medium, the latter being acutely sensitive to impacts sustained in excess of those incidental to the momentum of the car while in transit.

Still another object of the invention is to provide an impact recorder which employs record sheets which are mounted on a yieldable part of the recorder, said movable part yielding only when excessive impacts are sustained by the recorder in order to make a record of such excessive impact on the record sheet.

Other objects of the invention will be apparent from the following description of the present preferred form of the invention, taken in connection with the accompanying drawings, wherein Fig. 1 is a side elevational view of an impact recorder constructed in accordance with the present invention, showing the shield removed and showing the case in dotted lines;

Fig. 2 is a fragmentary longitudinal sectional view of the impact recorder per se;

Fig. 3 is a transverse sectional view of the recorder showing the shield in position over the shaft and showing the record sheet in position on the record sheet holder;

Fig. 4 is an end elevational view of the record sheet holder per se;

Fig. 5 is a detail fragmentary longitudinal sectional view taken on the line 5—5 of Fig. 2, looking in the direction of the arrow;

Fig. 6 is a detail fragmentary sectional view of the stylus supporting shaft, showing the stylus carrying block in top plan;

Fig. 7 is a detail fragmentary elevational view of one of the record sheet retaining clamps, and, Fig. 8 is a detail end elevational view of the stylus.

The device of the present invention embodies a supporting base generally designated 9, which in the present instance is shown to consist of an integral casting, the ends of which are extended downwardly to provide supporting feet 10 which are adapted for impingement with the floor of a railway car or other support. A frame 11 rises upwardly from the upper face of the base bottom, the terminals of which issue into brackets 12, the upper ends of which are enlarged to provide bosses in which openings 13 are formed. The frame 11 is set in from the sides and ends of the base bottom. One end of the base bottom extends further beyond the bracket 12 than the opposite end to provide a supporting platform 14. The brackets 12 are enlarged immediately above the base bottom to provide bosses 15 which are provided with screw threaded bores which complement threaded enlargements 16 formed upon a screw threaded shaft 17. The shaft 17 extends longitudinally through the supporting base in parallelism to the bottom of the latter. One end of the shaft 17 extends beyond one of the brackets 12 and is equipped with a knurled head 18 which may be employed for turning the shaft. The opposite end of the shaft is reduced and extends beyond the opposite bracket 12, as indicated at 19, and is adapted for engagement with a clock mechanism mounted within a clock casing 20 which is carried by the platform 14 of the supporting base. Mounted midway between the sides of the frame 11, and extending longitudinally along the top of the base bottom, are a pair of ribs 21 which are spaced to provide a channel in which a screw block 22 is slidably mounted. The screw block carries an inherently resilient stylus 23 which, in the present instance, is shown as composed of a wire strand which is equipped, midway its ends, with a scribing point 24. The block 22 is fed along the shaft 17 when the latter is rotated either by the knurled head 18 or by the clock mechanism carried within the casing 20.

The openings 13 formed in the top of the brackets 12 are adapted to rotatably receive the ends of a supporting shaft 25. One end of the shaft is extended beyond one of the brackets 12 and is provided with a kerf 26, the latter being adapted for the reception of a spring pressed latch member 27. The latch member 27 is pivotally mounted, as indicated at 28, on one of the brackets 12 and is normally held in the kerf 26 under the influence of a spring 29 which is convoluted about the axis of the latch member 27. The latch member 27 retains the shaft from rotative movement in an obvious manner.

A record sheet holder or pendulum generally designated 30 is pivotally mounted on the shaft 25 and embodies a pair of annuli or rings 31 which are formed integral or fixedly secured to the ends of the record sheet holder body 32. The body 32 is bifurcated midway its opposite sides, the inner end of the bifurcation being closed by a plate 33 which is detachably engaged, through the medium of screws 34, to the furcations of the holder, as illustrated to advantage in Fig. 3. A record sheet retaining bar 35 is pivotally mounted, as indicated at 36, between the furcations at one end of the latter and is adapted to extend through the slot or bifurcation of the holder. The other end of the bar is equipped with an extension 37 which is adapted to be sprung into an opening 38 formed in a spring plate 39 which is mounted upon one end of the record sheet holder 32. The bar 35 is provided with a further extension which serves as a finger piece, as indicated at 40, which projects beyond the extension 37 and is adapted for use in manipulating the bar. The plate 39 has one end thereof extended and rolled over to provide an operating terminal 41 through the medium of which the plate may be flexed away from the record sheet holder in order to permit the retaining bar 35 to be disengaged.

A record sheet 42 is adapted for engagement with the record sheet holder 32 and may be of any desired construction. It has been found preferable to employ manifold paper sheets which are engaged with the outer face of the record sheet holder and may be urged into the bifurcations of the holder 32 by the bar 35. This is effected by engaging the bar with the sheet, midway the ends of the latter, after which the bar is urged into the bifurcation until the extension 37 is sprung into the opening 38 of the spring plate 39. The portion of the record sheet which projects outwardly beyond the bifurcation of the record sheet holder is then pressed into engagement with the outer face of the holder and is secured in this position by clips 43. The clips 43 are pivotally mounted on the ends of the holder and are permitted to be swung into engagement with the sides of the latter in order to secure the longitudinal edges of the sheet against the holder to clamp the sheet from displacement as illustrated in Fig. 3. When the sheet is engaged with the holder in this manner it is apparent that the swinging of the holder will cause the sheet to be engaged by the scribing point 24 of the stylus 33 which leaves a mark on the sheet.

In order to restrain appreciable movement of the record sheet holder under ordinary working conditions, suitable means is provided. The means which I prefer to employ in the present instance consists of a pair of collars 44 which are sleeved on the shaft 25 and are provided with openings 45 which are adapted to receive the terminals of a coil spring 46. The collars are also provided with openings, arranged parallel to the openings 45, in which abutment pins 47 are mounted. The ends of the pins project beyond the opposite sides of the collars as advantageously illustrated in Fig. 2.

The outer ends of the pins 47 are adapted to engage complemental pins 48 which depend from the shaft 25 in order to limit movement of each collar in one direction, movement in the opposite direction being limited by the tension of the spring. The inner ends of the pins 47 are engaged with fingers 49 which project upwardly from the terminals of the plate 33. It is manifest therefore that this arrangement dampens the oscillations of the record sheet holder so that the latter will yield to permit the marking of the record sheet by the stylus only when the impacts sustained by the recorder are excessive.

It is preferred to encase the shaft 25, and means mounted thereon for yieldably connecting the record sheet holder thereto, and for this purpose a metal shield 50 is provided which is urged over and above the shaft 25 and has its marginal edges engaged with the upper outer faces of the record sheet holder. The inner wall of the shield carries spring fingers 51 which engage the upper inner faces of the record sheet holder. The shield is in this way supported on the holder over the shaft 25 and the opening in the top of the record sheet holder without in any way interfering with the operation of said holder.

In use of this device the record sheet 42 is engaged with the holder in the manner above described. Preferably a casing 52, shown by dotted lines in Fig. 1 of the drawings is engaged over the recorder and with the base of the latter and if desired, may be locked thereto to prevent access to be gained to the interior of the recorder by unauthorized persons. The holder is then anchored on the floor of a railway car or any other movable object. It is of course understood that the stylus is set at one extreme end of the screw shaft 17 by the operation of the knurled head 18 and the shaft 17 is of course rotated by the clock mechanism. The stylus is fed along the shaft 17 at a predetermined rate of speed so that the stylus will not traverse the entire length of the shaft before the trip has been completed. Ordinary impacts sustained by the car or other object, due to usual road conditions, etc., will not make a record on the sheet because the scribing point of the stylus is located in the bifurcation of the record sheet shown in Fig. 3. However, when excessive impacts are sustained the arc of movement of the record sheet holder intersects the path of the stylus so as to engage the latter and thereby mark the record sheet. The stylus is inherently resilient and when flexed under pressure, will be engaged in slots 53 formed in the opposite sides of the stylus block 22. As soon as the record sheet holder returns to a normal position the stylus flexes out of the slots 53. The time of the occurrence of excessive impacts is determined by the location of the marks made by the stylus on the record sheet. The intensity of the impacts sustained by the car or other object with which the recorder is associated is ascertained by the length of the marks on the record sheet. The shaft 25 is held from movement by the latch element 27 but when it is desired to insert the record sheet in the holder or to remove it therefrom, the latch is removed from the kerf 26 of the shaft against the resistance of the spring 29 and pressure exerted on the holder so as to rotate the same, in conjunction with the shaft 25 to bring the holder on top of the shaft where it will be readily accessible for changing the sheet. At the end of the trip it is customary to open the case 52 and remove the record sheet as above described so that the sheet may be preserved for future reference.

Although the device of the present invention has been constructed especially for use on railway rolling stock it is nevertheless to be understood that it is also susceptible of use on any other vehicle or moving body in order to record impacts or shocks, especially where it is desired to ascertain the time of occurrence and the intensity of the impacts sustained. The device of the present invention is very compact and may be conveniently carried in the hand and will occupy a negligible amount of space when in use. It is of course to be understood that although I have herein shown and described a preferred form of using the invention, nevertheless, various changes may be made therein within the scope of the claims hereto appended.

What is claimed is:

1. In an impact recorder, scribing means and a record sheet holder having a surface adapted to oscillate in contact with the scribing means and provided with a central slot, in combination with a member received in the slot to maintain a portion of a record sheet carried by the surface of the holder out of contact with the scribing means.

2. In an impact recorder, a record sheet holder and scribing means associated for free oscillation of relatively short length, spring means for damping excessive oscillations, and means carried by the oscillating members and contacting with the spring means at the end of an undamped portion of each oscillation.

3. In an impact recorder, a frame, a shaft carried thereby, a record sheet holder swingably associated with the shaft, scribing means carried by the frame and coacting with the record sheet holder, a spring carried by the shaft and means carried by the record sheet holder adapted to be moved against the resistance of the spring during a portion of the swinging movement of the record sheet holder.

4. In an impact recorder, a frame, a shaft carried thereby, a record sheet holder swingably associated with the shaft, scribing means carried by the frame and coacting with the record sheet holder, a spring carried by the shaft and means carried by the record sheet holder adapted to be moved freely during a portion of the swinging movement of the record sheet holder and to be moved against the resistance of the spring during the remainder of such movement.

JOHN B. BASKERVILLE.